(12) United States Patent
Hanson et al.

(10) Patent No.: US 7,330,322 B2
(45) Date of Patent: Feb. 12, 2008

(54) UTILIZING A COMBINATION OF PHYSICAL TRACKS AND VIRTUAL TRACKS TO STORE DATA ON A DATA STORAGE MEDIUM

(75) Inventors: Reed David Hanson, Chaska, MN (US); Brian Robert Pollock, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 10 days.

(21) Appl. No.: 11/046,037

(22) Filed: Jan. 28, 2005

(65) Prior Publication Data

US 2006/0171050 A1 Aug. 3, 2006

(51) Int. Cl.
*G11B 5/09* (2006.01)
(52) U.S. Cl. ........................................................ 360/48
(58) Field of Classification Search ................. 360/48, 360/77.04, 78.09, 77.02, 31; 714/4, 8
See application file for complete search history.

(56) References Cited

U.S. PATENT DOCUMENTS

| | | | |
|---|---|---|---|
| 5,835,930 A * | 11/1998 | Dobbek ........................ 711/4 |
| 6,128,153 A | 10/2000 | Hasegawa et al. |
| 6,130,797 A | 10/2000 | Akagi et al. |
| 6,545,835 B1 * | 4/2003 | Codilian et al. ......... 360/77.04 |
| 6,574,070 B2 * | 6/2003 | Gregg ..................... 360/78.09 |
| 6,611,396 B1 | 8/2003 | Kermiche et al. |
| 6,654,198 B2 * | 11/2003 | Liu et al. ................. 360/77.04 |
| 6,707,635 B1 * | 3/2004 | Codilian et al. ......... 360/77.04 |
| 6,754,032 B1 | 6/2004 | Szita et al. |
| 6,847,503 B2 * | 1/2005 | Zhang et al. ............. 360/77.04 |
| 6,850,385 B1 * | 2/2005 | Woods ..................... 360/77.04 |
| 6,859,341 B2 * | 2/2005 | Min et al. ................. 360/77.04 |
| 6,924,959 B1 * | 8/2005 | Melkote et al. .......... 360/77.04 |
| 6,937,424 B2 * | 8/2005 | Chang et al. ............. 360/77.04 |
| 6,956,711 B2 * | 10/2005 | Hanson et al. ........... 360/77.04 |
| 6,975,468 B1 * | 12/2005 | Melrose et al. ................ 360/31 |
| 6,993,678 B2 * | 1/2006 | Cheok et al. .................... 714/8 |
| 2002/0039248 A1 * | 4/2002 | Liu et al. .................. 360/77.04 |
| 2002/0145817 A1 | 10/2002 | Szita et al. |
| 2002/0167752 A1 * | 11/2002 | DuLaney et al. ........ 360/77.02 |
| 2002/0176199 A1 | 11/2002 | Gomez et al. |
| 2002/0178571 A1 | 12/2002 | Slezak |
| 2003/0002197 A1 | 1/2003 | Seng et al. |
| 2003/0112546 A1 | 6/2003 | Hanson et al. |
| 2003/0184906 A1 | 10/2003 | Hanson et al. |
| 2003/0184909 A1 * | 10/2003 | Zhang et al. ............. 360/77.04 |
| 2003/0193736 A1 * | 10/2003 | Min et al. ................. 360/77.04 |
| 2004/0021971 A1 | 2/2004 | Hanson et al. |
| 2004/0021977 A1 * | 2/2004 | Lim et al. ................. 360/77.04 |
| 2004/0049605 A1 | 3/2004 | Pollock et al. |
| 2004/0100719 A1 | 5/2004 | Wilson et al. |
| 2004/0246619 A1 * | 12/2004 | Zhang ...................... 360/77.04 |
| 2004/0264032 A1 * | 12/2004 | Baum et al. ............. 360/77.04 |

\* cited by examiner

*Primary Examiner*—Fred F. Tzeng
(74) *Attorney, Agent, or Firm*—Westman, Champlin & Kelly

(57) ABSTRACT

A data storage system and a method for storing data in a data storage system are provided. The data storage system includes a data storage medium that has at least one physical track that stores at least a portion of manufacturing process data, and virtual tracks that store user data.

20 Claims, 5 Drawing Sheets

UTILIZING A COMBINATION OF PHYSICAL TRACKS AND VIRTUAL TRACKS TO STORE DATA ON A DATA STORAGE MEDIUM

FIELD OF THE INVENTION

The present invention relates generally to data storage systems. In particular, the present invention relates to utilizing a combination of physical tracks and virtual tracks to store data on a data storage medium of a data storage system such as a disc drive.

BACKGROUND OF THE INVENTION

Disc drives read and write information along substantially concentric tracks formed on discs. Each of the concentric tracks is divided into a plurality of sectors. Each of these sectors usually includes a servo field and a data field that are contiguous. To locate a particular track on a disc, disc drives use the embedded servo fields in the sectors. The embedded servo fields are utilized by a servo sub-system to position a head over a particular track on a rotating disc.

In most current disc drives, the servo fields are written onto the disc in-situ (i.e., after the disc is mounted on the spindle motor of a disc drive) when the disc drive is manufactured and are thereafter simply read by the disc drive to determine position during operation. Ideally, a head following the center of a track moves along a perfectly circular path around the disc. However, various types of errors prevent heads from following this ideal path. One type of error is a written-in error that arises during creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path. Written-in errors are often referred to as repeatable run-out (RRO) errors or written-in repeatable run-out (WI-RRO) errors because they cause the same position errors each time the head passes along a track.

Instead of using the above-described discs with in-situ written or post-written tracks, some current disc drives include discs with servo-tracks that are pre-written onto the discs before the discs are mounted on the spindle motor of the drive. When discs with pre-written tracks (pre-written discs) are mounted on a spindle motor of a disc drive, there is a certain amount of misalignment of the track center of the disc and the spin axis of the spindle motor. Because of such disc mounting tolerances, the pre-written tracks are eccentric to the spin axis of the spindle motor. This eccentricity of the tracks causes additional RRO errors.

To address the additional RRO, in certain types of disc drives with pre-written discs, instead of attempting to follow the eccentric tracks during normal drive operation, compensation signals are injected into a servo control loop of the servo-subsystem to cancel the RRO and cause the head to follow virtual tracks that are concentric with the axis of rotation of a disc. Virtual track parameters or physical track (written track) misalignment compensation parameters, which are used to produce the compensation signals, are computed and stored in flash memory during manufacture of the disc drives. In such drives, virtual track parameters are usually stored in flash memory because, if these parameters are written to the media on virtual tracks, it would be impossible to seek to these tracks the first time the drive is used. Utilizing additional flash memory to store the virtual track parameters and other manufacturing process data (mapped flawed sectors, offsets between heads in the drive and other data computed during manufacture of the disc drive) is costly and complex.

Embodiments of the present invention provide solutions to these and other problems, and offer other advantages over the prior art.

SUMMARY OF THE INVENTION

An embodiment of the present invention relates to data storage systems that include data storage media that utilize a combination of physical tracks (tracks defined by written-in servo sectors) and virtual tracks (tracks that are substantially concentrically aligned with an axis of rotation of the data storage media and that are established using physical track misalignment compensation parameters) to store manufacturing process data and user data, thereby addressing the above-mentioned problems.

A data storage system and a method for storing data in a data storage system are provided. The data storage system includes a data storage medium that has at least one physical track that stores at least a portion of manufacturing process data, and virtual tracks that store user data.

Other features and benefits that characterize embodiments of the present invention will be apparent upon reading the following detailed description and review of the associated drawings.

DETAILED DESCRIPTION OF ILLUSTRATIVE EMBODIMENTS

An embodiment of the present invention provides a data storage system that includes a data storage medium that has fixed known physical tracks, on which virtual track parameters are stored, and virtual tracks, defined by the virtual track parameters, that store user data. In such data storage systems, there is no need for additional flash memory to store the virtual track parameters.

Figure 1:
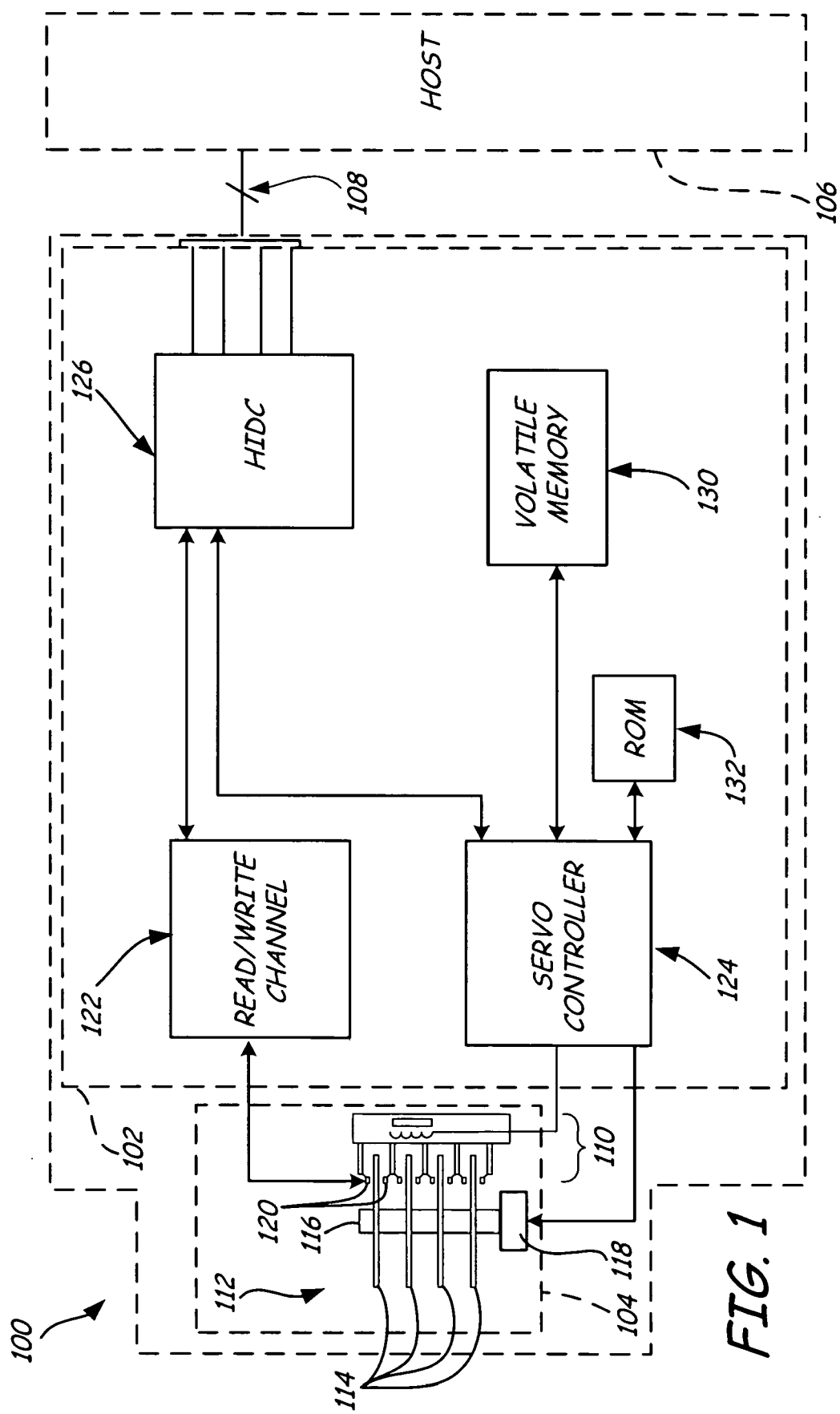
FIG. 1 is a simplified block diagram of a disc drive data storage system in accordance with an embodiment of the present invention.

FIG. 1 is a simplified block diagram of a disc drive data storage system 100 in accordance with an embodiment of the present invention. The same reference numerals are used in the various figures to represent the same or similar elements. Disc drive 100 includes, as its primary components, a head-disc assembly (HDA) 104 and a printed circuit board assembly (PCBA) 102. PCBA 102 includes a plurality of components (such as read/write channel 122, servo controller 124, host interface and disc controller (HIDC) 126 and memories such as 130 and 132), that provide a target interface controller for communicating between a host system 106 and HDA 104. Host system 106 can include a microprocessor-based data processing system such as a personal computer or other system capable of performing a sequence of logical operations. Data is transmitted between host system 106 and PCBA 102 via a host bus connector 108. Host bus connector 108 may comprise any type of data exchange interface for coupling to a disc controller in a host computer such as SCSI (Small Computer System Interface), UDMA (Ultra Direct Memory Access), ATA (Advance Technology Attachment), FCAL (Fibre-Channel Arbitrated Loop), or other standards as are known in the industry or are developed in the future. HDA 104 includes an actuator assembly 110 and a disc assembly 112. Disc assembly 112 includes a plurality of pre-written media discs 114, stacked on a spindle assembly 116. Spindle assembly 116 is mechanically coupled to a spindle motor 118 for rotating discs 114 at a high rate of speed.

Actuator assembly 110 includes a voice coil motor and multiple actuator arms. Located at the end of each actuator arm are one or more transducer heads such as 120, which are associated with a respective disc surface. Transducer heads 120 communicate with read/write channel 122, which performs encoding and decoding of data written to and read from the disc by transducer heads 120.

Servo controller 124 controls the operation of actuator assembly 110 and spindle motor 118. Servo controller 124 maintains a substantially constant spin rate of spindle motor 118.

HIDC 126 communicates with host system 106 via host bus connector 108 by receiving commands and data from, and transmitting status and data back to, host system 106. In addition, HIDC 126 tracks the timing of data sectors passing under a currently selected transducer head and accordingly sends data to, and receives data from, read/write channel 122. Further, HIDC 126 provides for error correction and error detection on data transmitted to and read from discs 114.

Figure 2:
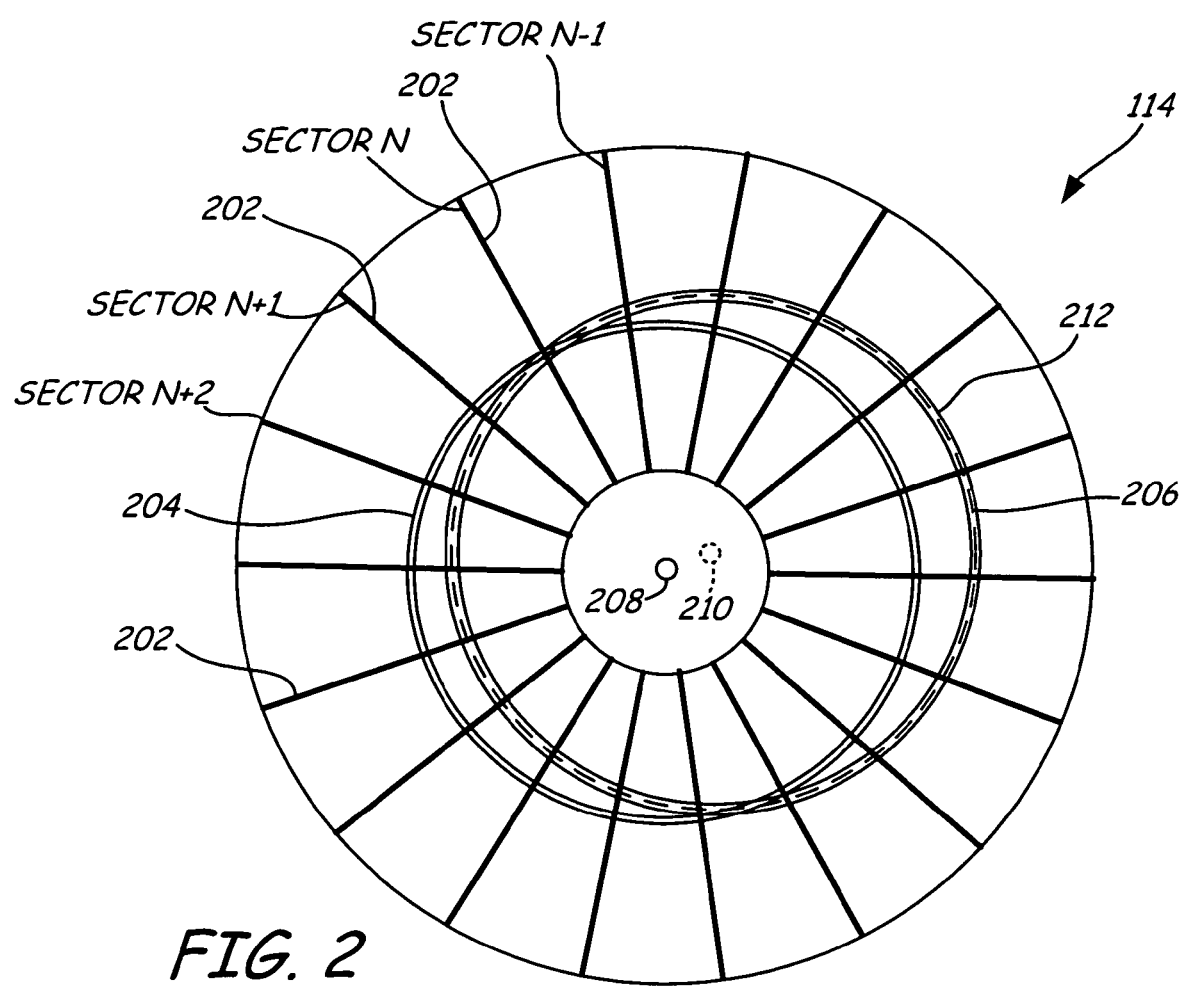
FIG. 2 is a simplified illustration of a disc showing eccentricity between pre-written servo tracks and an axis of rotation of the disc.

As mentioned above, discs 114 are pre-written discs. Therefore, there is a certain amount of misalignment of the track center(s) of the disc(s) and the spin axis of the spindle motor. FIG. 2 is a simplified illustration of a disc 114 showing the misalignment between physical tracks 204 (only one shown) defined by pre-written servo sectors or fields 202 and a path 206 that a head 120 follows as disc 114 rotates. Physical tracks 204 are concentric with a servo track axis 208 and path 206 is concentric with an axis of rotation (spin axis) 210 of disc 114. A large degree of eccentricity exists between physical tracks 204 and path 206 due to the misalignment of servo track axis 208 and axis of rotation 210 when disc 114 is mounted to spindle 116 of disc drive 100. This misalignment can be in the range of 1000 microinches or more, which results in a periodic or sinusoidal repeatable run-out (RRO) that has significantly larger displacement magnitudes than the small and somewhat random RRO associated with discs having post-written servo tracks.

In a disc drive (such as 100), virtual tracks 212 (only one shown), which are substantially concentrically aligned with the circular path 206 and axis of rotation 210 of disc 114 (as illustrated in FIG. 2) are established. This is accomplished by compensating a servo control loop in disc drive 100 with compensation signals that eliminate the position errors that would arise during track following operations due to the RRO, thereby causing head 120 to follow virtual tracks 212. A significant amount of energy is conserved by following virtual tracks 212 rather than the written-in tracks 204.

As noted earlier, virtual track parameters, which are used to produce the above-mentioned compensation signals, are computed during manufacture of the disc drive. As mentioned above, the virtual track parameters are not written to the media on virtual tracks since it would be impossible to seek to the virtual tracks the first time the disc drive is used because the location of the virtual tracks would be unknown until the parameters are accessed. In general, at least the virtual track parameter portion of the manufacturing process data should be accessible to the servo sub-system before the disc drive can store and retrieve user data after power-up. Accordingly, in disc drive 100, at least the virtual track parameter portion of the manufacturing process data (MPD) is stored on fixed known physical tracks that are accessible upon power-up of the disc drive. Typically, the virtual track parameters form a small portion of the MPD. Details of how the physical tracks are selected and accessed are provided further below.

Figure 3:
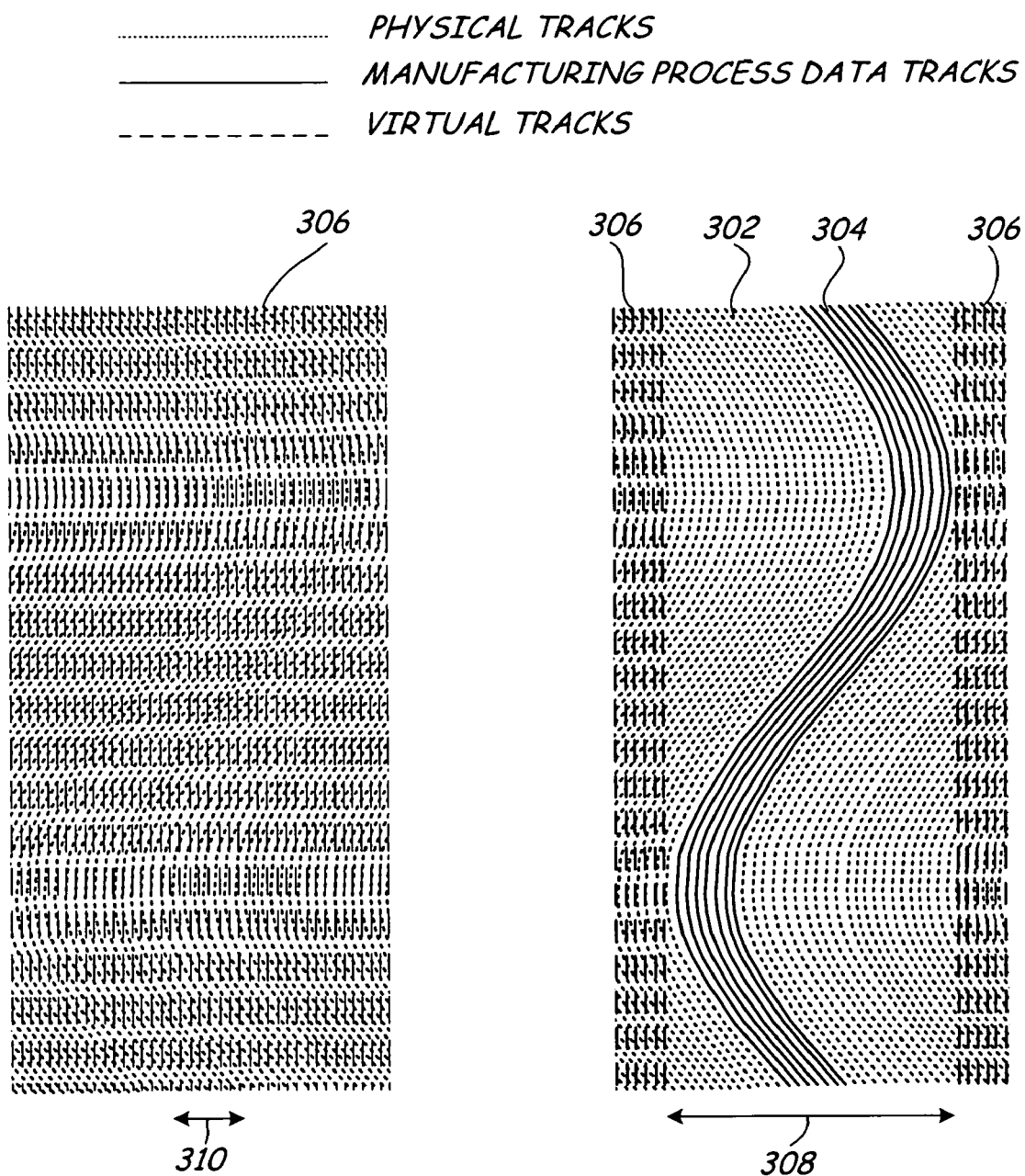
FIG. 3 is a diagrammatic illustration showing a comparison of radial media spans required to store all manufacturing process data on virtual tracks and physical tracks, respectively.

It should be noted that, although it would be possible to write all the MPD on physical tracks and to write only the user data on the virtual tracks, this may be undesirable since a large loss in format efficiency arises when a relatively large number physical tracks with MPD written on them are mixed with virtual tracks as illustrated in FIG. 3. In FIG. 3, reference numeral 302 represents physical tracks without written data, reference numeral 304 represents physical tracks with MPD written on them and reference numeral 306 represents virtual tracks. Note from FIG. 3 that the region of the media required to store the MPD on physical tracks (represented by radial span (distance along a radius of the disc) 308) is significantly larger than the region needed if the MPD were written on virtual tracks (represented by radial span 310). The additional region required would be equal to the run-out arising due to track eccentricity (the run-out is equal to twice the track eccentricity). If all the MPD were written on physical tracks, the additional region of the recording band that would have to be allocated for the MPD would be about twice the track eccentricity specification. This represents a significant loss in the format efficiency.

Figure 4:
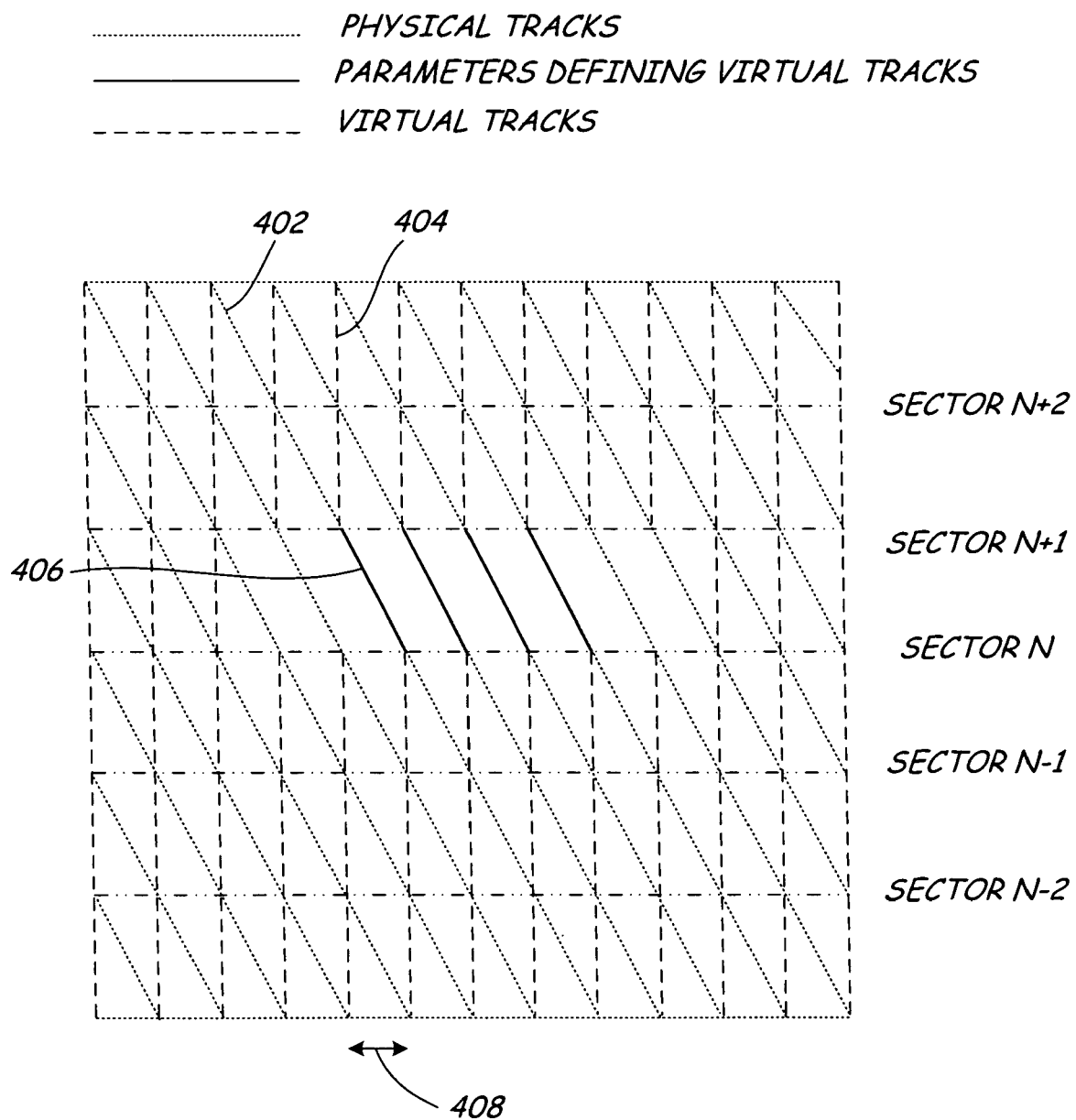
FIG. 4 is a diagrammatic illustration of the radial media span required to store only a virtual track parameter portion of the manufacturing process data on physical tracks.
Figure 5:
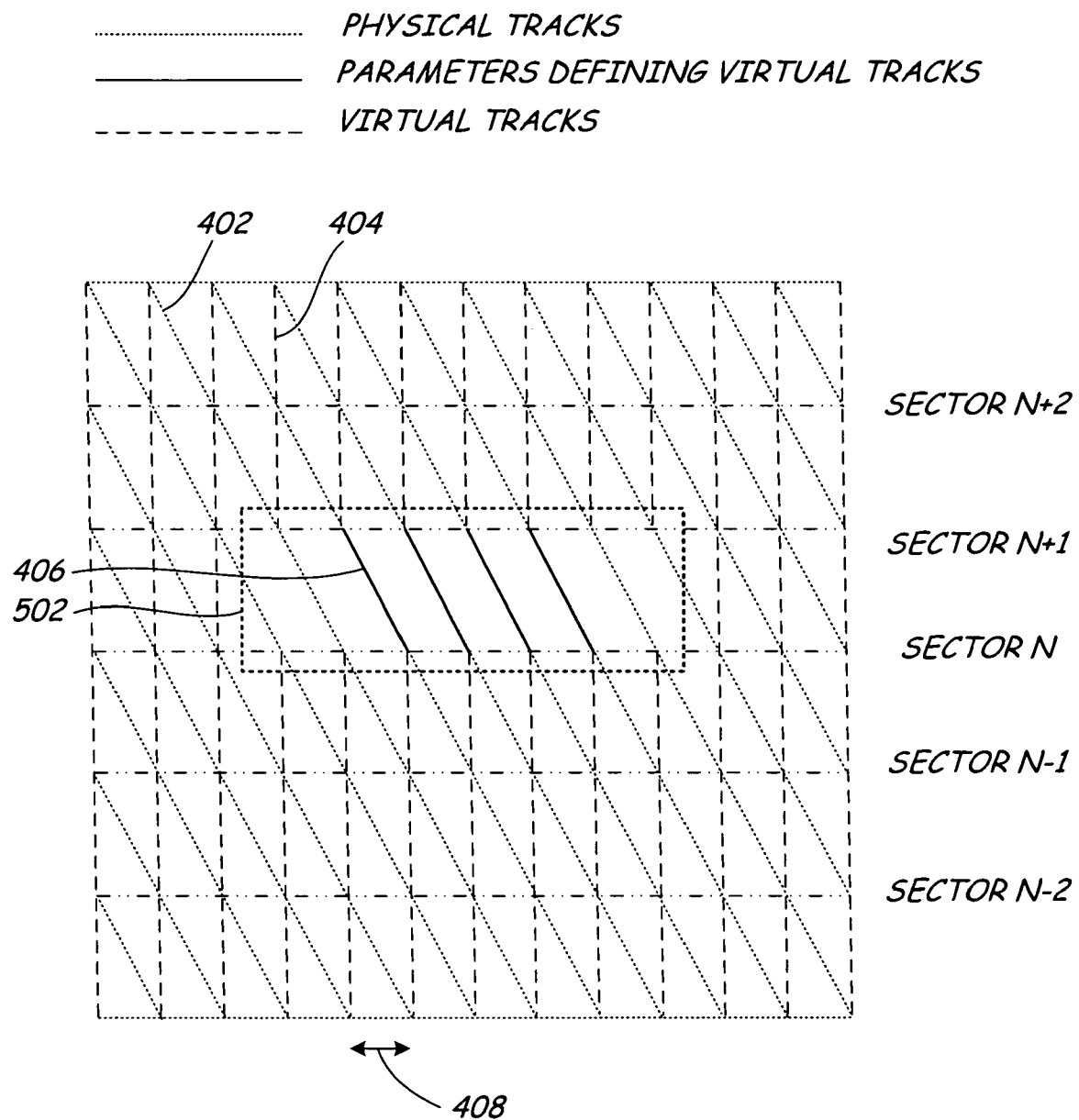
FIG. 5 is a diagrammatic illustration of a portion of a disc surface where sectors including stored virtual track parameters would be logged as servo flaws and de-allocated (or reserved).

Thus, in a preferred embodiment of the present invention (shown in FIG. 4), only parameters defining the virtual tracks are written onto the physical track(s) and the rest of the MPD is written on virtual tracks. Since the virtual track parameter data typically includes only a few hundred bytes, it can be written within one sector. In FIG. 4, reference numeral 402 represents physical tracks without written data, reference numeral 404 represents physical tracks with stored parameters defining virtual tracks and reference numeral 406 represents virtual tracks. Note from FIG. 4 that the radial span of the physical track over a single sector (represented by the horizontal distance 408 in FIG. 4) is relatively small. These sectors could be located anywhere within the actuator arm usable stroke, and the only limitation would be that it be written at a known fixed location. Since duplicate copies of the MPD are often written to the media for reliability, four duplicate copies of the parameters defining the virtual tracks are shown written in FIG. 4 for illustration. The data could be surrounded by other data which is written on virtual tracks. The surrounding tracks could be MPD tracks, customer data tracks, or other tracks. In this case, it would be important that these sectors containing the virtual track information never get unintentionally erased. One method to ensure that these data never get erased would be to determine the location of these sectors relative to the surrounding virtual tracks. This calculation could be done in the manufacturing process once the virtual track parameters were calibrated. The calculation performed would be to determine the virtual tracks and sectors that overlap with the physical sectors on which the virtual tracks parameters were written. These sectors in this surrounding region could then be logged as servo flaws and de-allocated (or reserved). In this manner, these sectors could be read only during the power on sequence, and, during normal drive operation, this region would be unusable. The region de-allocated is illustrated in FIG. 5 and represented by reference numeral 502 therein. As can be seen in FIG. 5, only a small number of sectors would have to be de-allocated (or reserved). The remaining MPD could then be written to virtual tracks. The power-up sequence of the disc drive would include first seeking to the physical track(s) containing the virtual track parameters and reading the information from the fixed known sector(s). Then the drive could seek to the virtual MPD tracks and read up the remaining manufacturing process data. In this manner, the loss in format efficiency is represented by the relatively small number of sectors shown de-allocated in FIG. 5.

In disc drive 100 (FIG. 1), locations of the physical tracks (or sectors) on which the virtual track parameters are written are stored in read only memory (ROM) 132. Thus, upon power-up of disc drive 100, the location information for the physical tracks containing the virtual track parameters is read from ROM 132, and a seek operation to these physical tracks is carried out. After completion of the seek operation, the virtual track parameters are read and stored in volatile memory 130. The remaining manufacturing process data is then read from the virtual tracks and also stored in volatile memory 130. After completion of the storage of all the manufacturing process data in volatile memory 130, disc drive 100 is ready for normal operation. Thus, in disc drive 100, there is no need for additional flash memory to store the manufacturing process data.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a data storage system that employs pre-written discs and utilizes a combination of physical tracks and virtual tracks to store data on the data storage medium, it will be appreciated by those skilled in the art that the teachings of the present invention can be applied to any data storage system that utilizes a combination of written-in tracks (pre-written tracks or post-written tracks) and virtual tracks, without departing from the scope and spirit of the present invention.

What is claimed is:

1. A computer-readable storage medium comprising:
   at least one physical track that stores virtual track parameter data; and
   virtual tracks defined by the virtual track parameter data, wherein the virtual track parameter data is stored independently of a flash memory.

2. The computer-readable storage medium of claim 1 wherein the virtual track parameter data is a part of manufacturing process data relating to manufacture of a particular device with which the storage medium is used.

3. The computer-readable storage medium of claim 2 wherein a first portion of the virtual tracks is utilized to store user data.

4. The computer-readable storage medium of claim 3 wherein a second portion of the virtual tracks is utilized to store manufacturing process data other than the virtual track parameter data.

5. The computer-readable storage medium of claim 1 wherein the virtual track parameter data is stored in a sector of the at least one physical track.

6. A data storage system including the storage medium of claim 5, the data storage system further comprising a read only memory that stores a location of the sector.

7. The computer-readable storage medium of claim 6 wherein the location of the sector is stored in a flawed sector table in the read only memory.

8. A data storage system including the storage medium of claim 1, the data storage system further comprising a volatile memory that temporarily stores the virtual track parameter data.

9. The computer-readable storage medium of claim 1 wherein a location of the at least one physical track is determined, during a manufacturing process, after the virtual track parameter data is obtained.

10. The computer-readable storage medium of claim 9 wherein the location of the at least one physical track is expressed relative to the virtual tracks.

11. A method comprising:
    storing virtual track parameter data on at least one physical track of a storage medium; and
    utilizing a first portion of virtual tracks, defined by the virtual track parameter data, to store user data,
    wherein the virtual track parameter data is stored independently of a flash memory.

12. The method of claim 11 wherein the virtual track parameter data is a part of manufacturing process data relating to manufacture of a particular device with which the storage medium is used.

13. The method of claim 12 and further comprising utilizing a second portion of the virtual tracks to store manufacturing process data other than the virtual track parameter data.

14. The method of claim 11 wherein storing virtual track parameter data on the at least one physical track comprises storing the virtual track parameter data in a sector of the at least one physical track.

15. The method of claim 14 and further comprising storing a location of the sector in a read only memory.

16. The method of claim 15 wherein storing the location of the sector in the read only memory comprises storing the location of the sector in a flawed sector table in the read only memory.

17. The method of claim 11 and further comprising reading the virtual track parameter data from the data storage medium and storing the virtual track parameter data in a volatile memory.

18. The method of claim 11 and further comprising identifying a location of the at least one physical track, during a manufacturing process, after the virtual track parameter data is obtained.

19. The method of claim 18 and further comprising expressing the location of the at least one physical track relative to the virtual tracks.

20. An apparatus comprising:
a head; and
a storage medium comprising:
   a physical track comprising stored location data corresponding to at least one virtual track; and
   virtual tracks,
wherein the stored location data corresponding to the at least one virtual track is stored independently of a flash memory.

* * * * *